United States Patent [19]

Morgan

[11] 4,358,846
[45] Nov. 9, 1982

[54] SERIAL DATA CORRELATOR/CODE TRANSLATOR

[75] Inventor: Larry E. Morgan, Titusville, Fla.

[73] Assignee: The United States of America as represented by the Administrator of the National Aeronautics and Space Administration, Washington, D.C.

[21] Appl. No.: 61,327

[22] Filed: Jul. 27, 1979

[51] Int. Cl.³ .............................................. G06F 11/00
[52] U.S. Cl. ........................................................ 371/6
[58] Field of Search ...................... 371/6, 57; 375/116; 328/119; 364/200 MS, 900 MS

[56] References Cited

U.S. PATENT DOCUMENTS

| | | | |
|---|---|---|---|
| 3,340,510 | 9/1967 | Tiffany | 328/119 |
| 3,396,369 | 8/1968 | Brothman et al. | 371/6 |
| 3,480,910 | 11/1969 | Brenza et al. | 371/6 |
| 3,523,278 | 8/1970 | Hinkel | 371/6 |
| 3,812,337 | 5/1974 | Crosley | 371/57 |
| 3,909,724 | 9/1975 | Spoth et al. | 375/116 |
| 4,063,310 | 12/1977 | McDonald | 364/900 |
| 4,163,209 | 7/1979 | McRae | 371/6 |
| 4,216,460 | 8/1980 | Baldwin et al. | 371/57 |

*Primary Examiner*—Harvey E. Springborn
*Attorney, Agent, or Firm*—James O. Harrell; John R. Manning

[57] ABSTRACT

A system for analyzing asynchronous signals containing bits of information for ensuring the validity of said signals by sampling each bit of information a plurality of times and feeding the sampled pieces of bits of information into a sequence controller. The sequence controller has a plurality of maps or programs through which the sampled pieces of bits are stepped so as to identify the particular bit of information and determine the validity and phase of the bit. The step in which the sequence controller is clocked is controlled by a storage register. A data decoder decodes the information fed out of the storage register and feeds such information to shift registers for storage.

2 Claims, 4 Drawing Figures

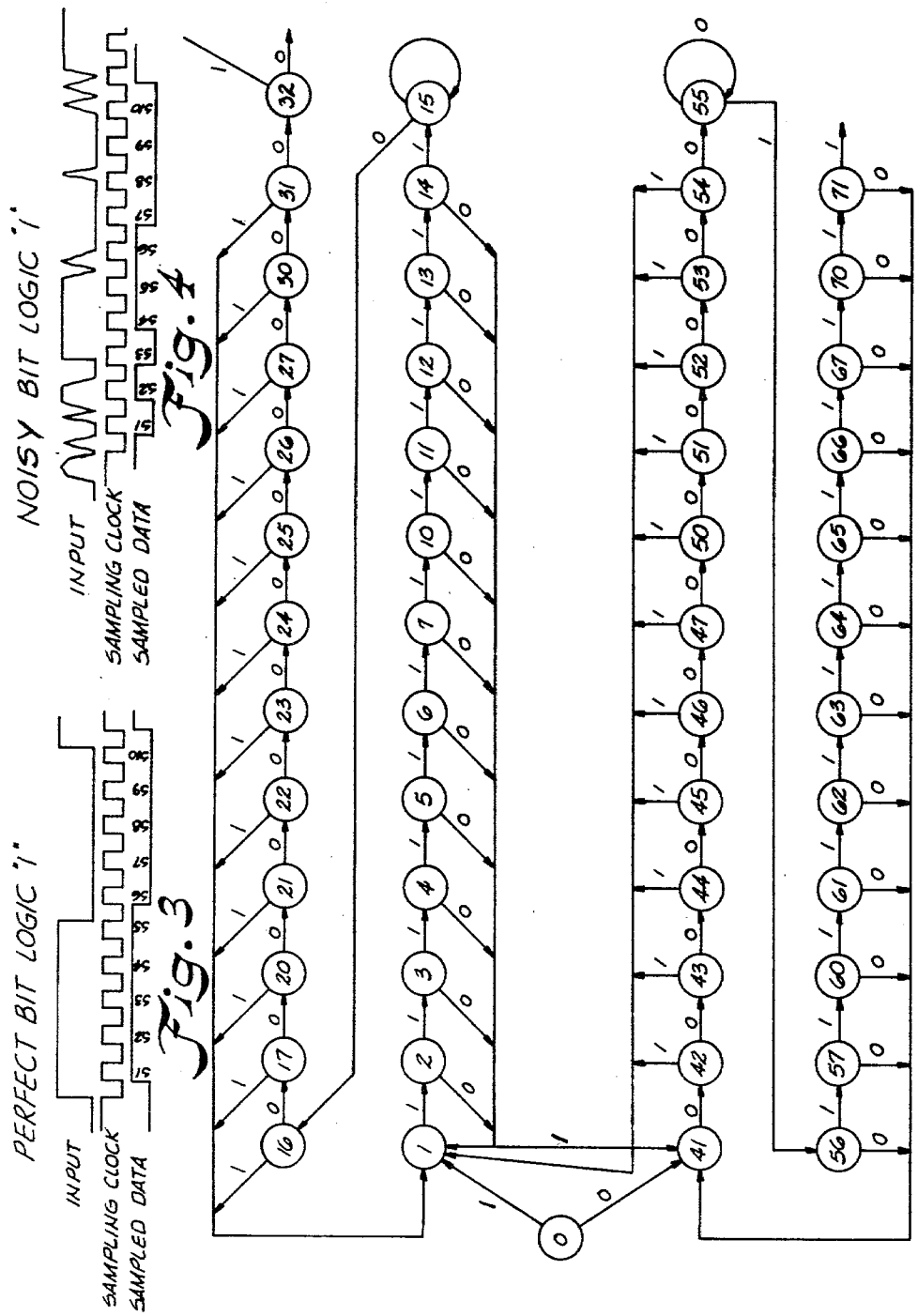

SERIAL DATA CORRELATOR/CODE TRANSLATOR

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

Heretofore, oftentimes when receiving signals from space vehicles or signals that are transmitted over long transmission lines in the form of coded serial data, the signals are distorted. As a result of distortion of the signals and noise, the signals would often be lost or incorrectly verified.

Most of the signals heretofore transmitted from remote transmitters such as carried in space vehicles were transmitted in the form of pulse coded modulated signals of a fixed format which prevented sending and receiving commands during the transmission of the signals. Normally, when utilizing PCM data, you are required to follow the format defined prior to the initiation of the tests. It provides an operator with limited flexibility with regard to data and command signals other than for data that was preprogrammed.

It is important that the data being received from remote locations prior to being utilized or recorded be verified to ensure polarity, sync and validity.

However, it is also desired that data not be discarded solely because it has been distorted to a certain degree. It is important that the signals being received be analyzed so that if the signal comes within a predetermined tolerance set by a programmer, it can be accepted as being accurate even though it is distorted to a certain degree. It is important, however, that this signal be reconstructed into proper shaped information for subsequent use.

SUMMARY OF THE INVENTION

The invention includes a system of analyzing asynchronous signals containing bits of information for ensuring the validity of the signals. Each bit of information is sampled a predetermined number of times by a flip flop under control of a clock. These sampled pieces of bits are, in turn, fed to a sequence controller; and, according to whether the signal is a zero or a one, are clocked through maps of predetermined configuration. In one particular embodiment, there are four preprogrammed maps, each including a plurality of steps. Two of the maps are for positive and negative sync and the other two are for identifying a positive and negative bit of information. The sample bits are stepped through the maps according to a predetermined format and if the bits come within predetermined tolerance levels set by one of the programs, this information is transmitted through the circuit into a sync signal or an NRZ signal. However, if the sample bits of information fail to meet the tolerance levels set, then these bits of information are rejected and the sequence controller recycles for receiving the next message.

A storage register is connected to the output of the sequence controller for keeping track of the step that the sequence controller is in and this information is fed back to the input of the sequence controller so that the incoming bits to the sequence controller are applied to the appropriate step in a respective map.

The outputs of the storage register is also connected to a data decoder for decoding the information from the storage register into useable information such as NRZ signals and sync signals. The data or NRZ signals are, in turn, stored within a shift register and subsequently transferred into a storage register. The above circuit is under control of a counter which is operated by clocked information extracted from the sample bits of information being supplied to the sequence controller. The sequence controller extracts a clock signal which corresponds to the transition signal of the bits of information being supplied to the sequence controller.

Accordingly, it is an important object of the present invention to provide a system for analyzing serial asynchronous data for ensuring the validity of the signals being received.

Still another important object of the present invention is to provide a relatively simple and accurate system for anlyzing asynchronous digital information that has been transmitted for determining if said signals come within certain tolerance levels.

These and other advantages of the invention will become apparent upon reference to the following specification, attendant claims, and drawings.

BRIEF DESCRIPTION OF THE DRAWINGS

FIG. 2 is a block diagram illustrating one particular map that is utilized in the sequence controller illustrated in FIG. 1.

FIG. 3 illustrates a perfect bit logic "1", the sampling clock signal, and the sampled data.

FIG. 4 illustrates a noisy bit logic "1", the sampling clock signal, and the resulting sampled data.

DESCRIPTION OF THE PREFERRED EMBODIMENT

Figure 1:
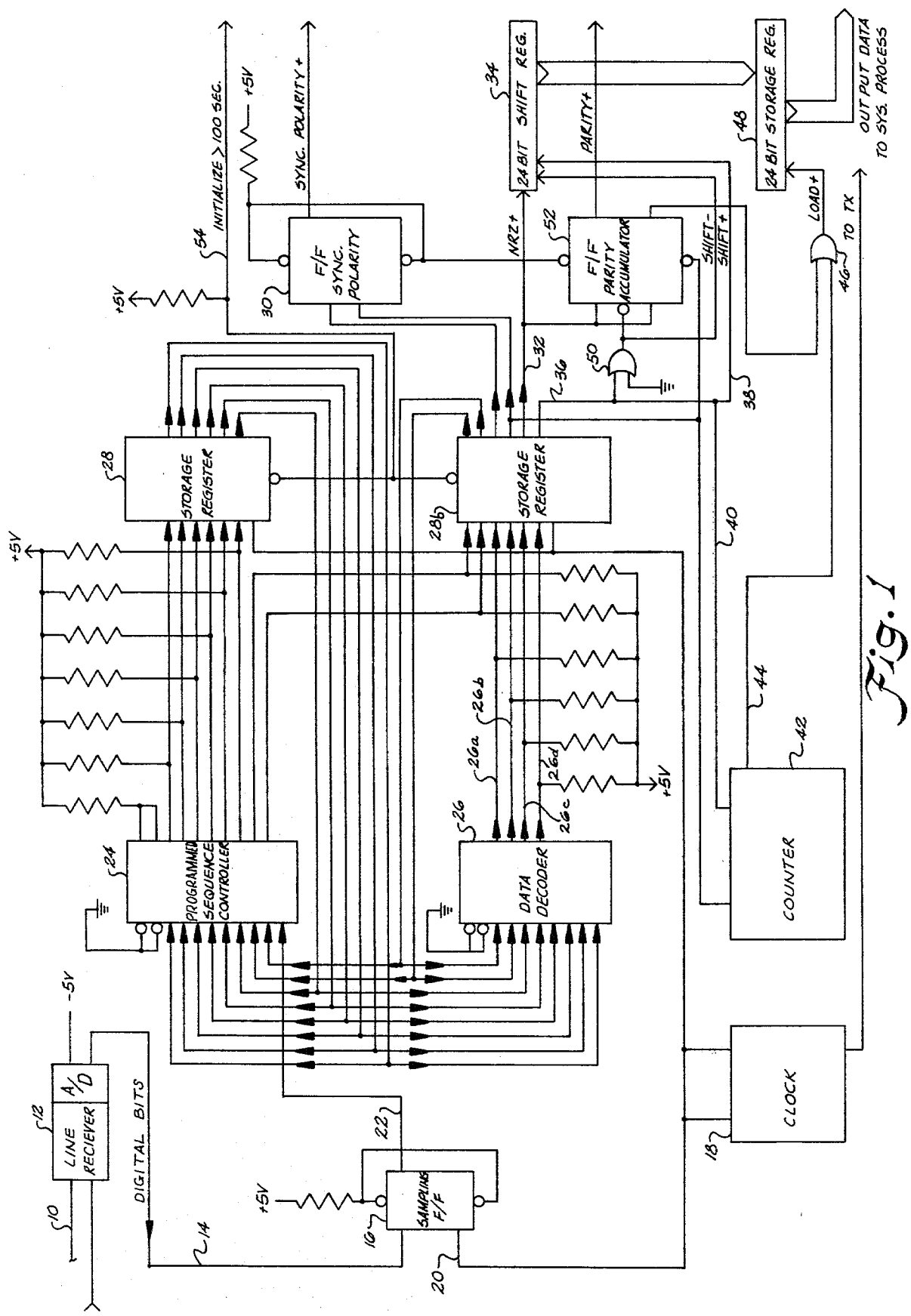
FIG. 1 is a schematic diagram illustrating a circuit constructed in accordance with the present invention for analyzing asynchronous signals.

Information is received over a transmission line 10 in the form of coded serial data such as Manchester Code and is fed into a line receiver 12 which includes an analog-to-digital converter which converts the incoming signals into digital form. These digital bits of information are fed from the line receiver 12 over line 14 to one input of a sampling flip-flop 16. A sampling clock 18 is connected by lead 20 to the other input of the sampling flip-flop 16.

The clock 18 is running at a rate so as to sample each bit of information ten times. Therefore, assuming that the bit of information being fed into the sampling flip-flop 16 is a perfect logic "1" (see FIG. 3), there will be five logic level "1's" fed to the output lead 22, then followed by five logic level "0's". A sequence controller 24 monitors the sampled data, filters noise and phase distortion, and provides control and timing inputs to a data decoder 26 as discussed more fully below.

The sample signals appearing on the output lead 22 of the sampling flip-flop 16 are fed in serial form to the sequence controller 24. The sequence controller 24 has a plurality of programs in the form of maps provided therein.

A typical map for a sync signal which includes a plurality of bits of information is illustrated in FIG. 2. As a sample bit of information enters the sequence controller, it is first entered into the "0" step shown thereon. Each of the consecutive steps of the map are consecutively numbered. If you draw a line through the middle of the drawing at the "0" step, all of the steps thereabove will be for verifying a positive sync signal, and all of the steps therebelow would be for verifying a negative sync signal. Other maps are used for verifying a 1-bit and 0-bit of information. The step that the sequence controller 24 is in at any particular time for receiving a piece of sampled bit is controlled by an output signal being produced by the storage registers 28a and 28b. Each time a sampled piece of a bit is fed into the sequence controller 24, the sequence controller 24 in turn supplies a signal to the storage registers 28a and 28b which keep track of the step that the sequence controller is in so that the next sampled piece of the bit is fed into the next consecutive step of the sequence controller 24. After sequence step 15 has been reached, in order to get to sequence step 32, sampled pieces of bits representing a "0" must be supplied. If a sampled "1" is received when the sequence step reaches sequence step 15, then you remain at sequence 15 as indicated by the circling arrow in FIG. 2 of the drawings until a sampled piece of bit representing a "0" is received. Upon reaching sequence step 32, a particular search has been fulfilled. For this particular map, it means that it has received the right polarity for each sampled piece of the bit and, as a result of reaching step 32, the data decoder indicates that a positive sync character has been received.

Going back to FIG. 1 of the drawing, the sequence controller 24 contains all of the various maps for analyzing the sample bits produced by the sampling flip-flop 16. However, it is necessary in addition to receiving the incoming sample bit over line 22 from the flip-flop to also receive a signal on the other input leads of the sequence controller indicating the sequence step that the sequence controller is in.

As, for example, if, when the fourth sampled bit is received, the sequence controller is in sample step 4, it is necessary for information to be supplied to the sequence controller indicating such. This signal is produced by one of the storage registers 28a and 28b in the form of an encoded signal which is coupled to the input of the sequence controller. The storage registers 28a and 28b have a plurality of output lines which are fed back to the input of the sequence controller 24. This prevents the data representing the sequence step from changing while the sequence controller is attempting to adjust for the next sequence step.

Furthermore, the storage registers 28a and 28b also feeds sequence step signals to the inputs of the data decoder 26. For a particular sequence step such as when step 32 is reached, the data decoder converts this signal into useable information. In this particular case, when sequence step 32 has been reached, it indicates that positive sync has been reached. The data decoder produces a signal on its output line which is fed through the stroage register 28b to a sync polarity flip-flop 30 indicating the step number and the polarity of the data.

The sync polarity flip-flop 30, in turn, produces a signal on its output representing positive sync polarity.

As previously mentioned, other maps in the sequence decoder are utilized for verifying the validity polarity of data. This validity check takes place in a similar manner as the map was used for checking sync.

After the sync signal has been received and recorded in the sync polarity flip-flop 30, normally data is received in the form of positive and negative bits of information. Each bit of information is sampled ten times in the sampling flip-flop 16 and sample signals are fed to the sequence controller. These sample signals are, in turn, fed through maps (not shown) for determining if a collective group of the sample signals identify either a logic "1" bit or a logic "0" bit. This is accomplished by stepping the sampled bits through a particular map similar to the map shown in FIG. 2. If the sampled bits do not meet the conditions set forth in the map, the sequence controller will revert back to a predetermined stage for looking for the next sync character.

As the sampled bits are stepped through the maps of the sequence controller, output signals are produced that are fed to storage register 28a and 28b. These output signals are, in turn, fed back to the input of the sequence controller 24 for identifying and determining the step that the information was just received in. Using the signal being fed back from the storage registers 28a and 28b along with the incoming signal on lead 22, the sequence controller steps to the next step according to the program.

Assuming that the sampled bits are stepped through the map and indicate valid information upon reaching a predetermined step, this signal is fed from the storage register to the data decoder 26. The data decoder 26, in turn, 26a, 26b and 26c and 26d decodes the signal and produces a decoded signal on one of its output lines 26a, 26b, 26c, or 26d indicating that a particular step has been reached. Upon reaching a particular step, a predetermined verification has occurred. For example, upon reaching step 32, a decoded signal is produced on line 26a indicating that positive sync has been verified. This signal is fed through the storage register 28b to line 32. When the data from the signals being analyzed appears on line 32, it is fed in sequential form into a 24 bit shift register 34.

Each of the sampled bits of information that is produced by the sampling flip-flop 16 contains its own clock information and this clock information is the transition signal from the positive portion of the signal to the negative portion of the signal.

The sequence controller, upon recognizing the transition, extracts the clock information out of the signals being supplied thereto, adjusts the clock information to compensate for phase distortion, and feeds this adjusted clock information to the storage register 28b out over lead 36.

The clock signal appearing in lead 26 performs several functions. First, it is supplied over lead 28 to the 24 bit shift register 34 for being utilized as a shift pulse for shifting the data into the shift register. It is also supplied by lead 40 to an input of counter 42 which counts the number of bits received. The counter 42 generates pulses on output lead 44 which are fed through a Nor-gate 46 and acts as a load signal for a 24 bit storage register 48 for transferring the bits stored in the 24 bit shift register 34 into the storage register 48.

The clock information appearing on lead 36 is also fed through a Nor-gate 50 into a parity accumulator 52. The parity accumulator 52 has an output lead 54 connected to another input of the Nor-gate 46.

In summarizing the operation of the system, the sequence controller 24 is loaded with a plurality of maps that are preprogrammed. These maps may be any suitable conventional maps, and one suitable type of map is manufactured by Martin Marietta for use in data acquisition via high speed data bus communication channels. Prior to analyzing any signals, first a signal is supplied over line 54 for initializing all of the registers. The initializing signal is supplied to the storage registers 28a and 28b for resetting all of the stages for storage register back to "0".

The incoming signals being received on transmission line 10 are fed into the line receiver and converted from analog-to-digital form prior to being fed into the sampling flip-flop 16. The sampling flip-flop samples each bit of information ten times. Assuming that a bit is a perfect Manchester coded bit, then you would have five logic level "1" sample signals and five logic level "0" sample signals with the transition being used for clock information.

However, as a result of noises and other problems inherent in transmitting signals, oftentimes a portion of the signal will be lost. If, however, enough of a signal is present that the probability is that it is actual data that has been distorted, it is desired that this data be fed through the system.

The programs within the sequence controller determines the tolerance between acceptance and rejection of a signal.

Therefore, as the sample signals from the sampling flip-flop 16 are fed into the sequence controller, they are fed through one or more maps. If they make it through various stages of the map, then this information is decoded by a data decoder 26 which generates a signal indicating data contained in that bit, and this information is stored in the shift register 34 and subsequently stored in a storage register 48. Similarly, you have sync signals that are also recognized and indicated to be valid.

The storage registers 28a and 28b generates a signal that is fed back to the input of the sequence controller for informing the sequence controller of the step that it was previously in so that the incoming sample bit appearing on lead 22 can be placed in the proper sequence steps for being clocked by the clock 18 to the next proper step.

While a preferred embodiment of the invention has been described using specific terms, such description is for illustrative purposes only, and it is to be understood that changes and variations may be made without departing from the spirit or scope of the following claims.

What is claimed is:

1. A system for analyzing asynchronous signals containing bits of information for ensuring the validity of said signals comprising:
    (a) a bit sampling means having a first input receiving said signals to be analyzed and an output;
    (b) clock means connected to said bit sampling means for causing said bit sampling means to sample each bit of information supplied thereto a plurality of times producing a plurality of sampled signals;
    (c) a sequence controller means connected to the output of said bit sampling means;
    (d) a plurality of programs stored in said sequence controller means representing maps having a plurality of sequence steps;
    (e) means for feeding said sampled signals to said sequence controller means and for sequentially stepping said sampled bits through said plurality of steps of said maps;
    (f) said sequence controller means generating coded signals identifying the steps as said sampled signals are stepped therethrough;
    (g) a storage register means having a plurality of input terminals and output terminals;
    (h) means for connecting said input terminals of said storage register means to said sequence controller for receiving coded signals from said sequence controller indicating the step that said sequence controller is in,
    (i) means for connecting said output terminals of said storage register means to said sequence controller means;
    (j) said storage register means generating signals identifying the sequence step that said sequence controller is operating in and supplying this signal back to said sequence controller means for controlling the sequential stepping of the sequence controller means as additional pieces of sampled bits are received; and
    (k) a data decoder means connected to said output terminals of said storage register means for decoding said signals generated by said storage register and producing predetermined output signals indicating that a particular step has been reached in said sequence controller.

2. The system for analyzing asynchronous signals as set forth in claim 1 further comprising:
    a shift register connected to said data decoder means for sequentially storing said predetermined signals produced by said data decoder means.

* * * * *